March 14, 1933.    R. ECKSTEIN    1,901,588

BATTERY

Filed June 26, 1930

INVENTOR.
REUBEN ECKSTEIN
BY
ATTORNEYS.

Patented Mar. 14, 1933

1,901,588

UNITED STATES PATENT OFFICE

REUBEN ECKSTEIN, OF NEW YORK, N. Y.

BATTERY

Application filed June 26, 1930. Serial No. 463,889.

This invention relates to batteries and the methods of making the same.

An object of this invention is to provide an improved battery construction as for example, a dry battery for flash lights and the like uses having means to prevent short circuits therein whereby waste of electrical energy from said batteries during shipment of the batteries or when storing the same or when a plurality of said batteries are inserted in tandem in a flash light casing is effectively prevented.

A further object of this invention is to provide a battery of the character described wherein the metallic shell is encased in a cylindrical sheath or casing, improved means for preventing relative movement or separation between the shell and its sheath.

A still further object of the invention is to provide a novel and improved process of manufacturing a battery of the character described.

Still another object of this invention is to provide a battery of the character described comprising few and simple parts which shall be easy and cheap to manufacture and which shall yet be practical and efficient to a high degree.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

Figure 1:
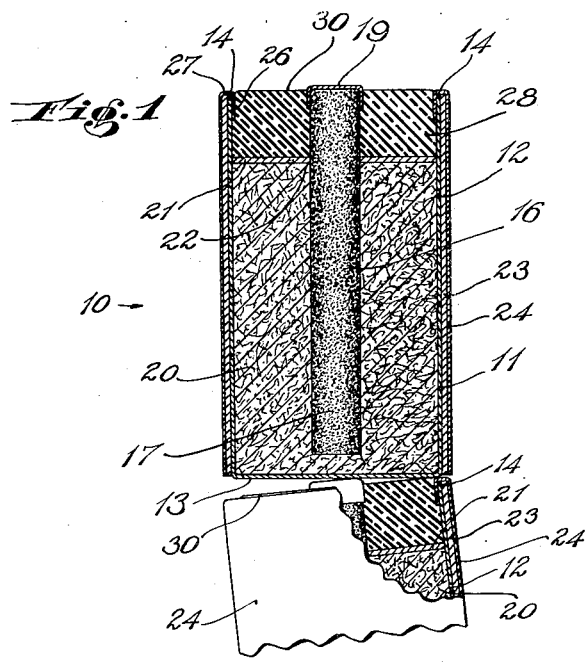
Figure 2:
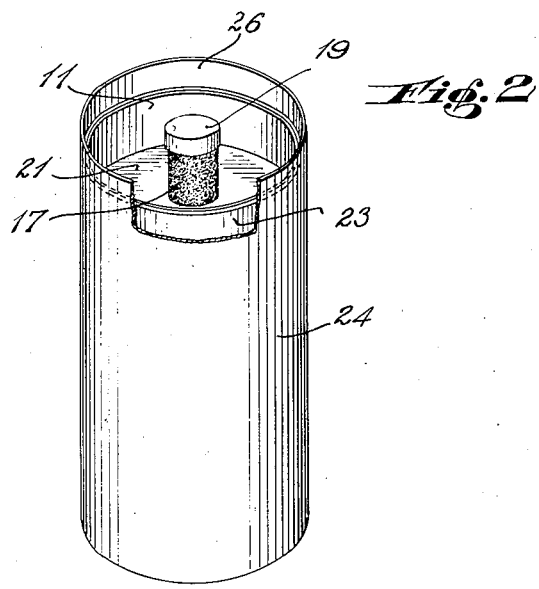

In the accompanying drawing, in which is shown one of the various possible illustrative embodiments of this invention, Fig. 1 is a partial cross-sectional view of a pair of batteries embodying the invention; and Fig. 2 is a perspective view of a battery embodying the invention illustrating a step in the process of manufacturing the same.

Referring now in detail to the drawing, 10 designates a battery embodying the invention here shown in the form of a dry cell adapted for use in flash lights or for the like objects and purposes. The battery preferably comprises a casing or shell 11 made of any suitable metal such as zinc, having a cylindrical or tubular portion 12 provided with an integral end wall or closure 13 at one end thereof and a rim or edge portion 14 at the opposite open end thereof. Axially mounted within the casing 11 is a bobbin 16 comprising a carbon electrode 17, the bottom end of which is spaced from said end wall 13, and having a metal cap 19 covering the upper end thereof. A suitable filler 20 may be inserted within the casing 11 and serves to aid in retaining the bobbin 16 in proper position within the casing. The top level of the filler is preferably below the rim 14. A disc member 21 made of cardboard or the like material is disposed over the top of said filler, said disc being formed with an axial opening 22 receiving the carbon electrode therethru.

Disposed about the cylindrical wall 12 of the casing 11 and frictionally fitted thereon is a cylindrical or tubular housing or sheath 23 of insulating material such as cardboard, paper board and the like. A covering 24 of insulating sheet flexible material, such as thin paper is disposed about and preferably pasted to the sheath 23, said covering 24 having a downwardly or inwardly turned rim portion 26 folded over the top rim portion 27 of said sheath 23 and against the inner surface of the cylindrical portion 12 of the shell 11 adjacent the top rim portion 14 thereof. Sealing material 28 such as wax and the like material, which hardens upon cooling to ordinary temperature, is disposed in the chamber between the top of the disc 21 and the top rim 14 of the shell 11, said sealing material serving to retain the folded portion 26 of the cover 24 in proper position and binding said portion to the shell 11.

It will be noted that the bottom wall 13 of the shell 11 projects somewhat beneath the lower edges of the cylindrical sheath or casing 23 and the cover 24, whereas the top surface of the cap 19 projects somewhat above the top surface 30 of the sealing material 28 and also above the top folded portion of the cover member 24.

The advantages of my improved battery, will now be clearly understood. The folded portion 26 of the cover 24 serves to insulate the upper rim 14 of the metallic shell 11. With this construction, short circuiting of the battery is effectively prevented, since metallic contact cannot be made between the cap 19 and the upper rim of the shell 11. Thus, when storing, stacking or shipping a quantity of the batteries, should a pair of batteries be positioned with respect to each other, as shown in Fig. 1, an electrical connection between the cap 19 and the shell 11 is prevented by the overturned portion of the insulating cover 24. Should the batteries be placed in the well known manner in tandem in a flash light, tilting of one or more of the batteries will not cause short circuiting of the battery and waste of the electrical energy.

With batteries now in use, wherein the upper rim of the metallic shell is not insulated, it has been found that in stacking a quantity of said batteries, as for instance on a counter for sale, short circuiting and waste of energy results, so that the purchaser does not obtain a fully charged battery.

Furthermore, with my improved construction, slipping or movement of the shell 11 with respect to the cylindrical casing 23 is prevented, since the folded portion 26 of the cover 24 is attached to the shell 11 by the sealing substance 28. Separation of the cardboard insulating casing 23 from the metallic shell is hence effectively prevented.

In making my improved battery, the cover member 24 is wrapped around the cylindrical casing 23 and attached thereto as by gluing or in the like manner, said cover being provided with the skirted portion 26 extending beyond the upper rim portion 27 of the latter. The filler 20, bobbin 16 and disc 21 are then properly inserted and assembled within the shell 11. The shell is then inserted into the casing 23 as by sliding the same therein to the position shown in Fig. 2 for bringing the rim 14 substantially to the level of said rim 27. The skirted portion 26 is then folded over said rim portions 27 and 14 and against the inner surface of the cylindrical wall 12 of said shell 11. The sealing material 28 is then inserted into the shell 12 above the disc 21 and permitted to cool and harden. Upon hardening the sealing material effectively seals the battery and serves to bind the folded portion 26 of the cover to the metallic shell 11.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention, I claim as new and desire to secure by Letters Patent:

1. A battery of the character described, comprising a metallic tubular casing having a rim edge portion and means for insulating said portion, said means comprising an insulating tubular member receiving said casing and a flexible insulating member glued to the outside of said insulating member and having a portion folded over said rim edge portion.

2. A battery of the character described, comprising a metallic tubular casing having a rim edge portion and means for insulating said portion, said means comprising a cardboard sheath receiving said casing and a flexible insulating member glued to the outside of said sheath and having a portion folded over said rim edge portion and against the inner surface of said casing, and sealing material within said casing adjacent said edge portion for retaining said folded over portion against said inner surface in folded position.

3. A battery comprising a metallic casing having a cylindrical portion open at one end and having an end wall at the opposite end thereof, a cylindrical sheath receiving said cylindrical portion and an insulating member disposed about said cylindrical sheath and having a portion folded over the rim edge of said sheath and cylindrical portion at the open end thereof.

4. In a dry cell, in combination, a metallic casing having a tubular portion and a tubular insulating sheath therefor, slidably and frictionally received thereon, and means for attaching said sheath to said casing, to prevent relative movement therebetween, said means comprising an insulating wrapper disposed about and attached to said sheath and having a portion folded over one end of said tubular portion, and sealing material within said end of said tubular portion attaching said folded-over portion of said wrapper to said casing.

In testimony whereof I affix my signature.

REUBEN ECKSTEIN.